United States Patent [19]

Derrick

[11] Patent Number: 4,822,547

[45] Date of Patent: Apr. 18, 1989

[54] PROCESS FOR THE EXTRUSION OF COMPOSITIONS COMPRISING POLYPROPYLENE, POLYVINYL ALCOHOL AND A POLYPROPYLENE-POLYVINYL ALCOHOL ADHESIVE

[75] Inventor: Wayne E. Derrick, Houston, Tex.

[73] Assignee: Shell Oil Company, Houston, Tex.

[21] Appl. No.: 34,373

[22] Filed: Apr. 6, 1987

[51] Int. Cl.$^4$ .................... B29B 11/10; B29B 11/14
[52] U.S. Cl. .................... 264/169; 264/171; 264/185; 264/211; 524/425; 524/436; 524/456
[58] Field of Search .............. 264/211, 169, 514–515, 264/DIG. 69, 176.1, 171, 185; 524/425, 436, 456, 503

[56] References Cited

U.S. PATENT DOCUMENTS

| | | | |
|---|---|---|---|
| 3,400,087 | 9/1968 | Robb et al. | 264/211 |
| 3,553,158 | 1/1971 | Gilfillan | 264/171 |
| 3,882,259 | 5/1975 | Nohara et al. | 264/171 |
| 4,013,622 | 3/1977 | DeJuneas et al. | 264/211 |
| 4,244,914 | 1/1981 | Ranalli et al. | 264/185 |
| 4,412,025 | 10/1983 | Corwin et al. | 264/176.1 |
| 4,522,775 | 6/1985 | Briggs et al. | 264/514 |
| 4,629,596 | 12/1986 | Coffman | 264/171 |
| 4,636,340 | 1/1987 | Itaba et al. | 264/211 |

FOREIGN PATENT DOCUMENTS 53-124573  10/1978  Japan .................. 264/211

*Primary Examiner*—Jeffery Thurlow

[57] ABSTRACT

This invention relates to a process for extruding scrap material comprising polyvinyl alcohol, polypropylene-polyvinyl alcohol adhesive and polypropylene prepared with a high activity polymerization catalyst, the improvement comprising utilizing in the polypropylene from about 50 to about 5000 ppm of hydrotalcite.

7 Claims, No Drawings

PROCESS FOR THE EXTRUSION OF COMPOSITIONS COMPRISING POLYPROPYLENE, POLYVINYL ALCOHOL AND A POLYPROPYLENE-POLYVINYL ALCOHOL ADHESIVE

FIELD OF THE INVENTION

This invention relates to an improved process for the extrusion of compositions comprising polypropylene, polyvinyl alcohol and a polypropylene-polyvinyl alcohol adhesive. The improvement involves the use of hydrotalcite in the polypropylene in order to reduce cross-linking during the extrusion process.

BACKGROUND OF THE INVENTION

Polypropylene can be utilized to make containers for holding a large number of varied materials ranging from foodstuffs to cosmetics. The diffusion of oxygen through the walls of a polypropylene container can degrade certain oxygen-sensitive materials. In order to avoid this oxygen degradation, the industry has developed complex multi-layered containers which impede oxygen diffusion. These containers basically comprise an inner polypropylene layer surrounded by a thin layer of polypropylene-polyvinyl alcohol adhesive, followed by a layer of polyvinyl alcohol, which provides resistance to oxygen diffusion, followed by a thin layer again of polypropylene-polyvinyl alcohol adhesive, and finally a polypropylene outer layer. The polyvinyl alcohol layer which provides resistance to oxygen diffusion, is however water sensitive, and for that reason must be surrounded by water impervious layers such as as the inner and outer polypropylene layers. In the manufacture of these multi-layered bottles, a certain amount of waste material is generated. In order to make the process more economical, the industry has taken to incorporating an additional layer prepared from waste polypropylene, which layer contains polypropylene, polyvinyl alcohol and polypropylene-polyvinyl alcohol adhesive, between the outer polypropylene layer and the outer adhesive layer or between the inner polypropylene layer and the inner adhesive layer. Basically, the apparatus utilized to prepare these containers consists of four extruders which extrude a tube having 6 layers in the wall. One extruder co-extrudes the polyvinyl alcohol; a second extruder co-extrudes the inner and outer adhesive layer surrounding the polyvinyl alcohol; a third extruder extrudes the reprocessed waste polypropylene/polyvinyl alcohol/adhesive; and a fourth extruder co-extrudes the inner and outer polypropylene layers. The extruded tube is sent to a blow molding unit which cuts off a section of the tube, seals one end, and blows the tube to the final shape of the container desired. It has been found that when the polypropylene utilized to prepared these containers is prepared from a high activity polymerization catalyst and the waste scrap from the tube manufacture is subsequently extruded, brown gels are formed. These gels adhere to the screw of the extruder, adversely affecting the performance of the extruder. Further, the gel particles subsequently break off, causing rejected products which discourages the use of the reprocessed waste material for preparing containers. The instant invention provides for a process to minimize or substantially eliminate this gel formation.

SUMMARY OF THE INVENTION

The instant process provides a method for the utilization of waste materials from the manufacture of polypropylene bottles containing an oxygen diffusion-inhibiting layer of polyvinyl alcohol. The invention provides a method for extruding these waste materials comprising polypropylene (prepared using high activity polymerization catalysts), polyvinyl alcohol and a polypropylene-polyvinyl alcohol adhesive without the formation of damaging gels. The improvement comprises utilizing a polypropylene containing a small amount of hydrotalcite, for example, less than about 5000 ppm, preferably less than about 3000 ppm by weight.

DESCRIPTION OF THE PREFERRED EMBODIMENTS

The polypropylene material utilized in the process of the instant invention will be a polypropylene material prepared using high activity polypropylene catalysts. These high activity catalysts comprise an organo aluminum compound of groups I through IV such as, for example, triethylaluminum and a solid component obtained by the reaction of a magnesium compound with a halide of tetravalent titanium. One or more electron donors such as a benzoate ester are also utilized when selectivity control is needed. Illustrative of high activity polypropylene polymerization catalysts are those provided in the U.S. Pat. No. 4,056,668, Berger et al, issued Nov. 1, 1977; U.S. Pat. No. 4,242,229, Fujii et al, issued Dec. 30, 1980; U.S. Pat. No. 4,298,718, Mayr et al, issued Nov. 3, 1981; and U.S. Pat. No. 4,414,132, Goodall et al, issued Nov. 8, 1983; all incorporated by reference herein. Polypropylene prepared with low activity catalysts does not present the gel formation problem when utilizing waste polypropylene as does the polypropylene prepared with high activity catalysts and hence, when polypropylene prepared with low activity polymerization catalysts is utilized, it is not necessary to utilize the process of the instant invention.

The polyvinyl alcohol (resin) which will be present in the waste polypropylene scrap material being re-extruded is used as a oxygen barrier in polypropylene containers. It is a water-soluble synthetic polymer, for example, made by alcoholysis of polyvinyl acetate. It has the general formula $-(CH_2CHOH)-$ and is readily available commercially. Other useful polyvinyl alcohols are random co-polymers of ethylene and vinyl alcohol having the general formula $-(CH_2-CH_2)_m(CH_2CHOH)_{\overline{n}}$. These latter materials are also referred to as ethylene polyvinyl alcohols or alcohol resins, although in this specification the terms "polyvinyl alcohol" and "polyvinyl alcohol resins" are meant to encompass the compounds described by the two above-described general formulas. Ethylene polyvinyl alcohol resins are available commercially from EVAL Company of America, Omaha, Nebr.

The polypropylene-polyvinyl alcohol adhesive that will be present in the waste polypropylene to be processed by the process of the instant invention it is an adhesive that is utilized to bond together the polypropylene and the polyvinyl alcohol diffusion barrier. In the absence of adhesive the polypropylene and the polyvinyl alcohol would not adhere to each other. Adhesives for these materials are well known in the art. A typical adhesive comprises a maleated polypropylene adhesive. The adhesives are available commercially from Mitsui Petrochemical Industries, Co., Ltd. (AD- MER ® Resins); Mitsubishi Petrochemical Company, Ltd. (MODIC ® Resins); E. I. du Pont de Nemours & Company (CXA ® Resins); and the Chemplex Company (Plexar ® Resins).

Hydrotalcite is a hydrous aluminomagnesium hydroxy carbonate. It occurs naturally in small deposits in the Urals of the Soviet Union and also in Snarum, Norway. In the natural state it has the general chemical formula $Mg_6Al_2(OH)_{16}CO_3.4H_2O$. A synthetic form of hydrotalcite has been synthesized. U.S. Pat. No. 3,539,306, issued Nov. 10, 1970 and U.S. Pat. No. 3,560,704, issued Mar. 21, 1972, both incorporated by reference herein, disclose synthesis techniques for the preparation of synthetic hydrotalcites. Miyata in Clays & Clay Minerals, 28, 50(1980) disclose the preparation of a synthetic hydrotalcite of the general formula $Mg_{4.5}Al_2(OH)_{13}CO_3.3.5H_2O$. Kyowa Chemical Industry Company, Limited, a Japanese company, commercially supplies a synthetic hydrotalcite compound having a following general formula $Mg_{4.5}Al_2(OH)_{13}CO_3.3.5H_2O$ which is particularly suitable for use in the intant invention. Dried and calcined forms of hydrotalcite are also suitable. The hydrotalcite can be incorporated into the polypropylene during the initial polymer preparation by slurrying the hydrotalcite with heptane and then pumping the resultant slurry into the polymer slurry and then processing the resultant material in the traditional manner to produce the polymer. However, a preferred method of adding a hydrotalcite is to add the hydrotalcite as a powder to polypropylene material along with other additives which are being added to the polypropylene to enhance processing stability and end use stability. In this preferred process, hydrotalcite powder, desired processing stabilizers and desired end use stabilizers are added to polypropylene powder or nibs or pellets; the resulting mixture is ground and/or extruded to provide a well-mixed polypropylene material containing the hydrotalcite and added stabilizers. This processed polypropylene is then utilized in the manufacture of the polypropylene layer in the multi-layered containers. Hydrotalcite is typically added to the polypropylene mixture in the range from about 50 to about 5000 ppm by weight total material, preferably from about 250 to 3000 ppm by weight, and more preferably from about 300 to 2000 ppm by weight of the total polypropylene mixture.

It has further been found that the effect of the hydrotalcite can be enhanced by adding to the polypropylene mixture of small amounts of an alkali metal or an alkaline earth metal stearate. When these stearates are utilized they will typically range from about 50 to about 5000, preferably from about 250 to about 3000 and more preferably from about 500 to about 2000 ppm by weight of the total polypropylene mixture.

The process of the instant invention will be illustrated by the following examples which are provided for illustrative purposes and are not to be construed as limiting the invention.

EXAMPLES

General Experimental Techniques

A polypropylene formulation was first prepared using polypropylene powder which was manufactured using a high activity catalyst similar to that described in U.S. Pat. No. 4,414,132 and the various additives listed in Table 1 were formulated by passing the mixture once through a ¾" Brabender extruder at 180 rpm. Then 7%w of a barrier resin polymer, EVAL ®-RESIN, supplied by EVAL Company of America, and 4%w of a polypropylene-polyvinyl alcohol adhesive, AD-MER ® QF500, supplied by Mitsui Petrochemical Industries Company, Limited, a Japanese company, were added to the above formulated polypropylene mix and the resultant material was then re-extruded continuously for 6 h at 120 rpm. The number of passes through the extruder for the 6 h period was recorded. At the end of the run the extruder screw was pulled and checked to see how much of the material was stuck on the screw. The temperature profile of the extruder was (200°, 210°, 220°, 230° C.). The results of these runs are discussed below for each example and the standard of Table 1. The following abbreviations are used herein rpm=revolutions per minute; BP=back pressure; E/A=Eval and adhesive addition; h=hour(s).

TABLE 1

| | Polypropylene Additives, in ppm | | | | | | |
|---|---|---|---|---|---|---|---|
| Example No. | STD | 1 | 2 | 3 | 4 | 5 | 6 |
| (1)Ethanox 330 | 1000 | 1000 | 1000 | 1000 | 1000 | 1000 | 1000 |
| (2)Irgafos 168 | 750 | 750 | 750 | 750 | 750 | 750 | 750 |
| (3)Glyceryl Monostearate | 2000 | 2000 | 2000 | 2000 | 2000 | 2000 | 2000 |
| Calcium Stearate | 500 | 1000 | — | 1000 | 1000 | 1000 | — |
| Hydrotalcite | | 2000(4) | 2000(4) | 1000(4) | 1000(5) | 1000(6) | 1000(6) |

(1)End use stabilizer, supplied by Ethyl Corporation.
(2)Process stabilizer, supplied by Ciba-Geigy Corporation.
(3)Antistatic agent, supplied by Glyco, Inc.
(4)DHT4A, supplied by Kyowa Chemical Industry Co., Ltd., 305 Yashimanishi-machi, Takamatsa, 761-01, Japan. This material is ultra fine particles treated with a surface active material to provide a good affinity with polymers.
(5)Dried DHT4A.
(6)Calcined hydrotalcite (DHT4A) provided by Kyowa.

| Experiment - STANDARD | |
|---|---|
| Rpm/BP before E/A | 180 rpm/300 psi |
| Rpm after E/A | 120 rpm |
| BP | |
| 1st pass | 260 psi |
| 2nd pass | 250–260 - *material (?) gathering around die opening - |
| 3rd pass | 250 - hardly any color change |
| 4th pass | 260 - die opening getting worse |
| 5th pass | 270 - die not as bad-strands worse |
| 6th pass | 250 - slight color change |
| 7th pass | 250 - slight color change |
| 8th pass | 250 - gels causing strand breaks |
| 9th pass | 250 - very little material around die - no longer is it collecting at die |
| 10th pass | 300 |
| 11th pass | 310 strands breaking a lot |

OBSERVATIONS: see *

The strands began to have a rough surface after the 2nd pass through, the material appears to be crosslinking and it's on the surface of the strand which seems to be collecting on the die opening as well. The material that is collecting on the die opening when cold becomes very brittle and hard. Experiencing strand breaks as well. Material began forming gels at about the 9th pass. As it gradually got worse the material at the die opening became less. The cross-linked material was attached to the screw upon removal-sticky when hot, crystalline hard when cool.

| Example 1 | |
|---|---|
| Rpm before E/A 180 | |
| Rpm after E/A 120 | |
| BP - 1st pass - 250 | BP - 2nd pass - 250 |
| BP - 3rd pass - 260 | BP - 4th pass - 240-250 |
| Noticable yellowing/browning after 4th pass - only | |
| Slight after 3rd pass | |
| BP - 5th pass - 250 | BP - 6th pass -the same |
| BP - 7th pass - 250 | BP - 8th pass - 260 |
| A strand broke during the 8th pass - | |
| BP - 9th = 260 | BP - 10th pass = 250-260 |
| BP - 11th pass = 200 psi | |

Comments -
No problems running at all
strand looks good
screw looks good

| Example 2 | |
|---|---|
| Rpm/BP before E/A | 180 rpm/375 psi |
| Rpm after E/A | 120 |
| BP | |
| 1st pass | 220 psi |
| 2nd pass | 200 psi - material gathering around die opening |
| 3rd pass | 220 psi |
| 4th pass | 230 psi - strands getting rough |
| 5th pass | 200 psi - strands getting worse |
| 6th pass | 230 psi - material around die opening getting worse |
| 7th pass | 120 psi - down-strands no longer forming |
| 8th pass | |
| 9th pass | |
| 10th pass | |
| 11th pass | |

OBSERVATIONS

After 2nd pass through, material gathering around die opening. This material was not crystalline, but was gooey until cooled at which time it became very hard. Screw looks good.

| Example 3 | |
|---|---|
| RPM/BP before E/A | 180 rpm/260 |
| RPM after E/A | 120 |
| BP | |
| 1st pass | 250 |
| 2nd pass | 245 - slight forming of material around die |
| 3rd pass | 240 |
| 4th pass | 245 |
| 5th pass | 245 |
| 6th pass | 245 - strand looks gocd |
| 7th pass | 240 - strand surface slight rough |
| 8th pass | 235 - yellowing |

| -continued | |
|---|---|
| Example 3 | |
| 9th pass | 245 |

COMMENTS

Screw looks good. There is a little bit of material forming around the die. Strand doesn't look as good as Example 2, but its color is better.

| Example 4 | |
|---|---|
| Back pressure first extrusion | 150 psi |
| 2nd | 170 psi |
| 3rd | 260 psi |
| 4th | 270-220 color still looks good |
| 5th | 150 strand looks great |
| 6th | 120-150 |
| 7th | 190 |
| 8th | 190 a little material forming at the die, slight color change strand getting a little rough |
| 9th | 200 |
| 10th | 250 |
| 11th | 200 |

COMMENTS

Material looks good, ran as well or better than Example 3. Color is a lot better than the Example 3 and Example 1. Screw looks clean.

| Example 5 | |
|---|---|
| B/P | |
| 1st ext. | 180 psi |
| 2nd | 130 |
| 3rd | 150 color looks good |
| 4th | 200 |
| 5th | 200 |
| 6th | 200-300 |
| 7th | 260 strand look good still |
| 8th | 260 everything still looks good |
| 9th | 200 |
| 10th | 230 |
| 11th | 250 |

COMMENTS

Everything ran great—no material collected at die opening. Screw looks clean. The color of this example was better (lower yellowness index) than that of standard, Ex. 1, 2, 3 and 4.

| Example 6 | |
|---|---|
| B/P | |
| 1st ext. | 250 psi - Material already started collecting at die opening |
| 2nd | 260 psi |
| 3rd | 260 |
| 4th | 250 |
| 5th | 250 |
| 6th | 200 |
| 7th | 190 |
| 8th | 180 - Still looks OK |

COMMENTS

Screw has some residue on it.
I claim:

1. In the process of extruding a composition comprising polyvinyl alcohol, a polypropylene-polyvinyl alcohol adhesive and a polypropylene prepared with a high activity polymerization catalyst, the improvement which comprises utilizing polypropylene having from about 50 to about 5000 ppm by weight of hydrotalcite incorporated therein to substantially eliminate gel formation.

2. The process of claim 1 wherein the amount of hydrotalcite ranges from about 250 to about 3000 ppm.

3. The process of claim 2 wherein the amount of hydrotalcite ranges from about 500 to about 2000 ppm.

4. The process of claims 1, 2 or 3 wherein the polypropylene additionally incorporates from about 50 to about 5000 ppm by weight of an alkali metal or an alkaline metal earth metal stearate.

5. The process of claims 1, 2 or 3 wherein the polypropylene incorporates from about 250 to about 3000 ppm by weight of an alkali metal or an alkaline earth metal stearate.

6. The process of claims 1, 2 or 3 wherein the polypropylene incorporates from about 500 to about 3000 ppm by weight of an alkali metal or an alkaline earth metal stearate.

7. The process of claims 1, 2 or 3 wherein the hydrotalcite has been calcined.

* * * * *